Jan. 14, 1969  B. N. FLEMING  3,421,479
THERMALLY CONTROLLED AUTOMATIC FEED DISPENSING APPARATUS
Filed Dec. 9, 1966  Sheet 1 of 2

INVENTOR
Bruce N. Fleming

BY
ATTORNEYS

INVENTOR
Bruce N. Fleming

United States Patent Office 3,421,479
Patented Jan. 14, 1969

3,421,479
THERMALLY CONTROLLED AUTOMATIC FEED
DISPENSING APPARATUS
Bruce N. Fleming, 430 Beech St.,
Ottawa, Kans. 66067
Filed Dec. 9, 1966, Ser. No. 600,428
U.S. Cl. 119—51.11   5 Claims
Int. Cl. A01k 5/02; B67d 5/28; G05d 23/02

This invention relates to dispensing devices and refers more particularly to automatic fish feeders.

An object of this invention is to provide a fish feeder which automatically dispenses a measured quantity of fish feed into a fish habitat feeding area at a twice a day rate.

Another object of the invention is to provide a rugged, reliable and inexpensive device which automatically and accurately dispenses fish feed and the like while requiring minimal care and attention other than an occasional filling of the hopper with the feed to be dispensed.

Another object of the invention is to provide an automatic feed dispensing device that utilizes the temperature change which occurs in the morning and the evening to actuate same.

A further object of the invention is to provide a thermally controllable automatic fish feeder that is operable to limit the dispensing of feed to predictable selected time periods during the day which are characterized by substantially temperature changes while remaining unaffected by slight and temporary temperature changes.

Another object of the invention is to provide a feed dispensing device which includes an uniquely constructed and operating compartmentalized dispensing bucket which automatically fills one portion of same as feed is dispensed from another portion.

A still further object of the invention is to provide a feed dispensing device of the character described which includes an unique dispensing bucket tripping mechanism, said mechanism being operable to dispense or dump the feed from the bucket:

(1) Early in the morning as the sun causes the ambient temperature around said device to rise, and (2) Late in the evening when the sun set results in a decrease in the ambient temperature.

Other and further objects of the invention, together with the features of novelty appurtenant thereto will appear in the course of the following description.

In the accompanying drawings, which forms a part of the specification and are to be read in conjunction therewith and in which like reference numerals indicate like parts in the various views.

Figure 1:
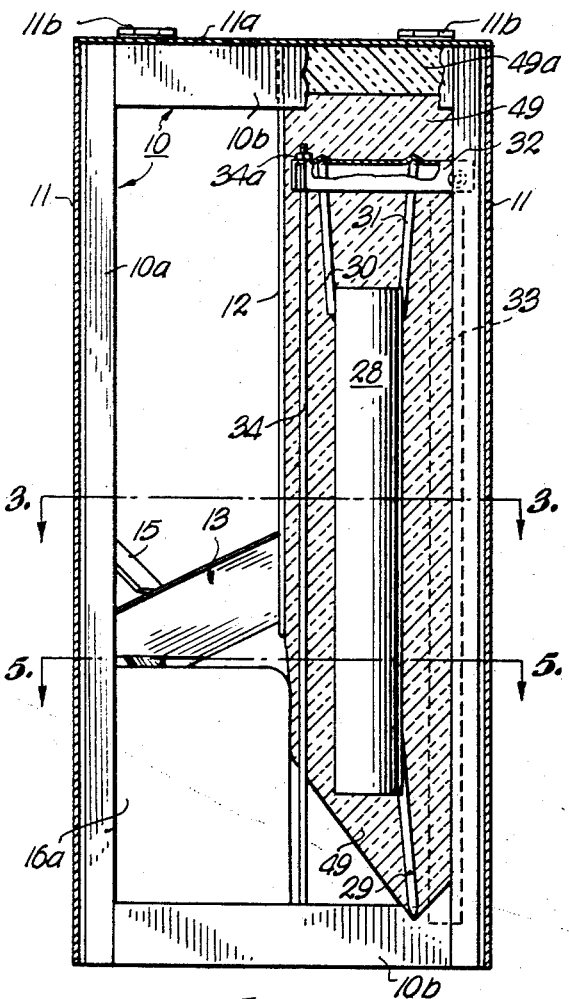
FIG. 1 is a front view of the fish feeder with the box of same shown in section.
Figure 2:
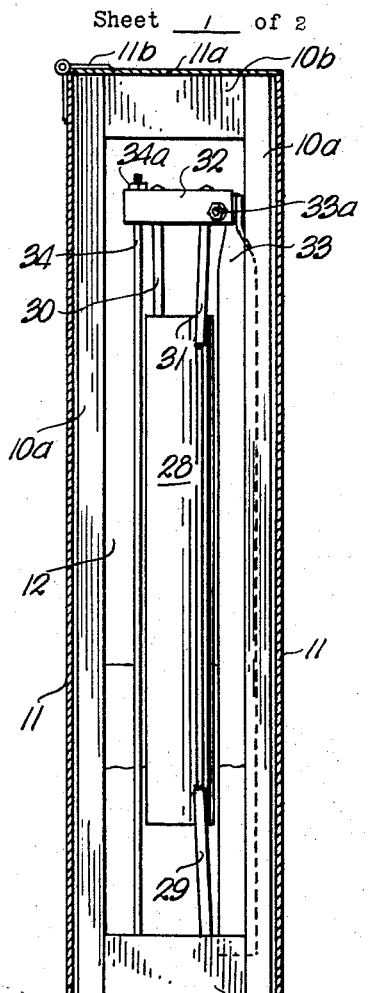
FIG. 2 is a side elevational view of the fish feeder with the box shown in section and the insulating material removed from around the thermostatic mechanism for purposes of clarity of assembly and description.

Referring now more particularly to the drawings, the subject fish feeder is supported by and mounted within a rigidly constructed metal framework generally designated by the numeral 10. This framework, having each side in the shape of a rectangle, includes vertically oriented angle structurals 10a which are rigidly interconnected by horizontally oriented structurals 10b. The framework 10 supports and encloses the thermostatic control section, the feed hopper, the dispensing bucket and the tripping mechanism, all of which will be discussed in more detail, infra.

When completely assembled, framework 10 will be inserted in a slightly larger similarly shaped open bottomed box 11. Box 11 has a movable top 11a which is hingedly connected to structurals 10a at 11b thereby facilitating the opening of the box for feed filling and assembly purposes. It should be pointed out that alternately the framework may be eliminated and that box 11 be used to solely support all the above-mentioned cooperating elements.

Divider 12 is weldedly connected and centered between the upper two longer horiozntally running structurals 10b. This divider separates or divides a substantial portion of the interior of the fish feeder into two separate sections. It should be noted that divider 12 does not extend all the way to the lower horizontal structurals, but rather runs approximately two-thirds of the length of same.

Figure 3:
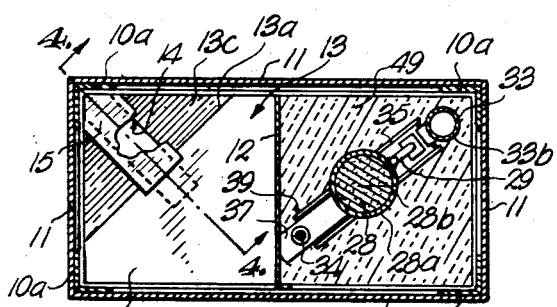
FIG. 3 is a sectional view taken substantially along the line 3—3 of FIG. 1 in the direction of the arrows, with a portion of the interior of the hopper broken away to show the communicating opening in the bottom of the hopper above the dispensing bucket.

Turning now more particularly to FIGS. 1 and 3, the upper left-hand portion of the fish feeder extending from the divider to the vertical side of cover or box 11 forms the hopper or reserve particulate feed holder for the device. The hopper portion extends from the upper structurals 10b downwardly to plate 13. This formed plate is weldedly connected to divider 12 and to the left angle structural 10a as seen in FIGS. 1 and 3. Plate 13, prior to being formed, has a rectangular flat surface, but is later creased along the line 13a so that the upper portion of plate 13 has surfaces 13b and 13c converging downwardly from their welded connections. It should be noted that the crease 13a is not centered or coincident with the diagonal of the rectangular surface and as a result, surface 13b, immediately adjacent divider 12, has a larger surface area than 13c. Surface 13c has opening 14 therein, same being located and sized for the purpose of discharging the particulate fish feed. Opening 14 extends from the crease line 13a to the upper left structural 10a as seen in FIG. 3. A metal flap 15 is welded to the structural 10a directly above opening 14 and runs parallel to the plane of said opening for the purpose of distributing the weight of the particulate feed and for reducing the effect of the dynamic loading of the feed particles against the bottom of the hopper.

Figure 4:
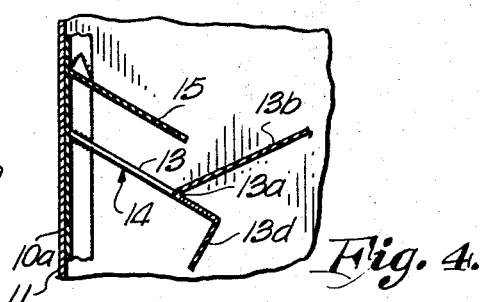
FIG. 4 is an enlarged fragmentary sectional view taken substantially along the line 4—4 of FIG. 3 in the direction of the arrows.

In constructing the plate 13 with discharge opening 14, that portion of plate surface 13c which is cut out to form the discharge opening 14 is bent downwardly and to the right as shown in FIG. 4. This tab, designated as 13d, provides a further means for directing the flow of the particulate fish feed out of the hopper. Tab 13d is aligned with an open portion of a chute 16, that has its open upper portion in communicating relationship with opening 14. The particulate fish feed falling from the hopper via opening 14 is accordingly directed in a predetermined path due to the presence of a chute 16 and tab 13d.

Figure 5:
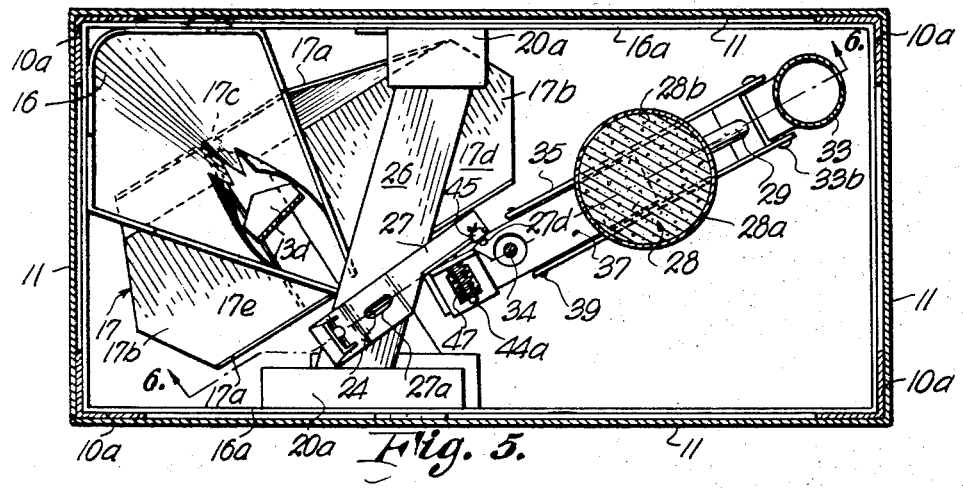
FIG. 5 is an enlarged sectional view taken substantially along the line 5—5 of FIG. 1 in the direction of the arrows and showing a top plan view of the tripping linkages utilized in the subject fish feeder.

Chute 16 may be independently constructed and weldedly connected to the upper left structural 10a or, as shown in FIGS. 1 and 5, welded to a separate and removable three-sided housing 16a. It is contemplated that the housing 16a may be made of a single rectangular piece of sheet metal that is divided into three equal sections and bent or formed so that the end sections are at right angles with the center section. The entire housing 16a may then be either bolted to or welded directly to the lower left portion of structurals 10a and 10b as seen in FIG. 1.

Figure 6:
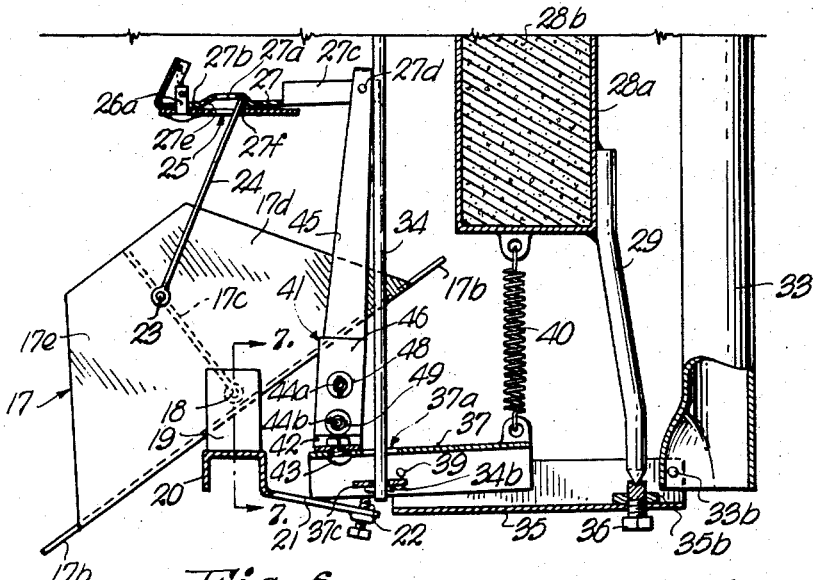
FIG. 6 is an enlarged fragmentary sectional view taken substantially along the lines 6—6 of FIG. 5 in the direction of the arrows.
Figure 7:
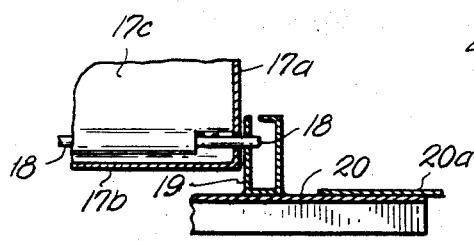
FIG. 7 is an enlarged fragmentary sectional view taken along the line 7—7 of FIG. 6 in the direction of the arrows.

Turning now more particularly to the construction and support of the dispensing bucket 17, FIGS. 6 and 7 are related to and show in part, the mounting and construction of said bucket. Bucket 17 is pivoted about rod 18 which is centered along the transverse center line of the bucket. Rod 18, as seen in FIG. 7, is rotatively mounted in a slot between the inner legs of a pair of identical brackets 19 which are supported on channel member 20. Channel 20 lies in a horizontal plane and is diagonally welded between the two supports 20a that are in turn welded to housing 16a. (Note particularly FIG. 5.)

The bucket is constructed of a single piece of sheet metal that has two identical sides 17a bent at right angles from a bottom or center portion 17b. The side portions 17a taper inwardly toward the vertical center line of the bucket as they extend from center sections 17b and are cut off parallel with the plane of said center section. A dividing plate 17c divides the bucket into equal compartments hereinafter identified by the numerals 17d and 17e. When assembled, rod 18 is centered with respect to the bucket and extends through sides 17a threadably interconnecting with plate 17c. Rod 18, carrying bucket 17, is rotatively positioned within brackets 19 and correctly locates the bucket relative to the discharge point of the abovementioned hopper.

Diverging tabs 21 are located on opposite sides of the supporting channel 20 and are centered beneath center section 17b of bucket 17. An adjustable screw lock nut combination 22 is a part of the outer end portions thereof and projects upwardly for possible contact with center section 17b. The outer end of screw 22 serves as a limit stop for bucket 17 as it is pivoted in either direction on rod 18. As seen in FIG. 6, when bucket 17 is pivoted to the right, center section 17b will contact screw 22 when dispensing feed from the right-hand compartment 17d. From FIGS. 5 and 6, it is clear that divider 17c separates bucket 17 into two equal compartments, 17d being the right-hand compartment and 17e the left-hand compartment. The position of bucket 17 and thusly which compartment is dumping and which is filling is partially controlled by swivel pin 24, which will be more completely discussed, infra.

A second rod 23, same being centered on sides 17a of bucket 17 and located near the upper end portion and seen in FIG. 6, extends horizontally from bucket 17 and provides a support means for the above-mentioned swivel pin. Pin 24, as its name implies, swivels on rod 23 and is constructed to extend upwardly therefrom through opening 25 in plate 26. Plate 26 is only partially shown in FIGS. 5 and 6, and its size and dimensions are important only in that it provides a mounting and sliding surface for tripping plate 27. Tripping plate 27 will be discussed in more detail later, however its relationship with respect to swivel pin 24 should be noted since the opening 27a in plate 27 allows pin 24 to protrude therethrough when aligned with opening 25. With pin 24 extending through both openings, the bucket is allowed to pivot about rod 18 depending on which compartment contains the weighted particulate fish feed.

Turning now to the temperature controlled thermostatic portion of the fish feeder, the thermostatic mechanism is housed within the above-mentioned framework to the right of divider 12 as seen in FIGS. 1 and 3. This temperature responsive mechanism utilizes the principle of translating relative movement due to the expansion of two or more members with substantially different expansion coefficients and rates. The mechanism is encased in an insulating material and will be described in more detail later.

Heat reservoir 28 is an integral portion of the thermostatic mechanism and acts as the more stable and slower to react of the expanding elements. As such, heat reservoir 28 is constructed of a hollow cylinder length 28a that is filled with either concrete 28b (as shown in FIGS. 3, 5 and 6) or in the alternative, water filled. A relatively short length of steel rod 29 is welded to the lower exterior of a cylinder or casing 28a. This rod has a pointed end, same being in point contact with a portion of the motion translating linkage (FIG. 6), the construction of which is discussed infra. Similar shaped rods 30 and 31 are welded to the upper portion of the reservoir 28 and extend upwardly therefrom. These rods make a point contact with upper channel bracket 32.

An aluminum tube 33 is bolted to one end portion of bracket 32 and extends downwardly therefrom. The upper end of tube 33 is crimped together and is appropriately apertured so that bolt 33a may extend through bracket 32 and tube 33 resulting in the above-mentioned connection. The other end portion of bracket 32 is connected with a smaller diameter steel rod 34. The upper end of rod 34 is externally threaded and extends through an aperture in bracket 32 allowing nut 34a to be tightened thereon. Both the aluminum tube 33 and rod 34 extend downwardly substantially parallel to the heat reservoir casing and are interconnected with the now to be described motion translating linkage.

As seen in FIG. 6, the lower end portion of aluminum tube 33 is partially crimped at its lower left end. The crimped portion is apertured and is riveted for a relatively rotative connection between the upturned sides of a substantially horizontally oriented channel bracket 35 by a rivet type connection 33b. Bracket 35, as a portion of the motion translating linkage, is embossed at 35b and threadably apertured therethrough to facilitate the mounting of bolt 36. Bolt 36 has a dimpled upper end which makes contact with the pointed end of rod 29. Accordingly, this contacting engagement forms a type of adjustable fulcrum relative to the rivet connection 33b. A second channel bracket 37 is oriented in an opposite manner relative to bracket 35 (with its sides turned down) so that it is overlapped by and positioned within approximately half of bracket 35. Connecting rod 39 passes through a suitable aperture in both sides of the two brackets, connecting same with slightly less than half of bracket 37 extending past the left end of bracket 35, as seen in FIG. 6. Again referring to FIG. 6, bracket 37 is spring biased in a counterclockwise direction via tension spring 40. This spring connects the right end portion of bracket 37 with heat reservoir casing 28a as shown and in such a manner that the right end portion is urged upwardly. (Alternatively, a compression spring could be inserted between brackets 37 and 35 and the spring urging them apart at the right-hand portion of bracket 37.)

The upper surface of bracket 37 is apertured at 37a to allow the lower end portion of steel rod 34 to extend therethrough. Aperture 37a is substantially larger than the diameter of rod 34 and does not contact the sides of rod 34. A plate 37c having an aperture aligned with 37b, is welded transversely between the sides of bracket 37. The underside of this plate contacts the upper surface of transverse lugs 34b which are formed with a portion of the lower end of rod 34 in such a manner that rod 34 may move downwardly without affecting bracket 37 but allowing a sufficient upward relative movement of same to cause bracket 37 to follow in a clockwise manner about rod 39.

Figure 8:
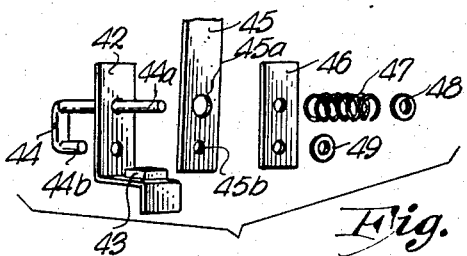
FIG. 8 is an exploded partial view of the lost motion connecting mechanism that forms a portion of the tripping linkages.

The portion of bracket 37 to the left of aperture 37a, as seen in FIG. 6, connects with a vertically oriented lost motion mechanism generally shown at 41. An exploded view of the lower portion of this mechanism is shown in FIG. 8. A mounting flange 42 is designed to ride the upper left-hand surface of bracket 37 and to be bolted through an appropriately sized aperture at 43. Flange 42 provides one surface for frictionally supporting a lost motion arm 45. A substantially U-shaped connecting rod 44 with one longer leg 44a, is inserted through vertically aligned apertures in bracket 42 and horizontally aligned apertures in moving arm 45 and friction plate 46. It should be noted that aperture 45a in arm 45 has a diameter almost twice as large as the diameters of the other apertures in flange 42, plate 46 and second aperture 45b. Spring 47 is designed to be placed over leg 44a and secured thereto by brad 48. This spring, under compression, causes plate 46 to bear against moving arm 45 under a controlled amount of pressure. The lower leg 44b of connecting rod 44 secures flange 42, arm 45 and plate 46. Accordingly, this connecting construction allows relative movement of flange 42 and plate 46 without movement of arm 45 during a portion of the travel arc of bracket 37 and affords protection to the mechanism during drastic temperatures changes, as will be described later.

Arm 45 has essentially two profile shapes. That portion of the arm 45 contacting frictional plate 46 is substantially rectangular. From this portion upwardly, the left edge of the arm tapers inwardly from left to right (FIG. 6) to its "folded over" top which serves as a connecting means for engaging tripping plate 27.

During the operation of the tripping mechanism, the moving arm 45 causes tripping plate 27 to move relative to supporting plate 26. Supporting plate 26 has a limit stop in the form of a screw or welded brad 26a. As mentioned above, tripping plate 27 has an aperture 27a that is oval in shape and aligns with a similarly shaped opening or aperture 25 in plate 26 at certain times during the movement of plate 27. The outer end of plate 27 contains a second oval aperture 27b and has its outer end portion bent upwardly and rearwardly with a circular shaped wire ring connecting the outer portion of the bent back end with the upper end of limit stop 26a. Accordingly, the ring and the limit stop confine the lateral shifting of tripping plate 27 to a predetermined area.

The construction of tripping plate 27 facilitates the interlocking of same with arm 45. The plate includes an upturned flanged portion 27c that is appropriately apertured for connection with the "folded over" top of arm 45 via a suitable pin 27d. That portion of plate 27 adjacent aperture 27a is contoured upwardly so that the underside of plate 27 has two portions that incline at approximately 45° and then level off to form a plane surface of aperture 27c that is substantially parallel to the sliding surface of plate 27. These two inclined surfaces, hereinafter designated as 27e and 27f, alternately make contact with swivel pin 24. As will be seen, bucket 17 is tripped or allowed to dispense its contents from one of its compartments when the movement of tripping plate 27 no longer allows the upward end of swivel pin 24 to contact either inclined under surfaces 27e or 27f of the tripping plate. When apertures 25 and 27a are aligned due to movement of plate 27, swivel pin 24 extends through both apertures and accordingly the center of gravity of bucket 17 due to the weight of the particulate feed results in a turning moment around the rod 18 and the contents will be dispensed therefrom.

A highly important and significant step in the construction of the fish feeder includes the application of insulating material to the thermostatic mechanism. The insulating material may be comprised of a number of different substances, however, I have found that Styrofoam of the type which may be poured as a liquid and allowed to set or harden in a selectable formed or molded shape is ideal both from the standpoint of ease of manufacture and assembly while providing a suitable insulating substance.

The thermostatic mechanism may be insulated by a convenient two-step method. First, heat reservoir 28 is placed upright in a special forming box. Liquid Styrofoam is poured around the heat reservoir. Due to the dimensions and shape of the forming box, the Styrofoam will harden so that the heat reservoir is encased in an insulation cylinder whose diameter would extend from the inner surface of rod 34 to the inner surface of tube 33, if same were assembled, and half way up the heat reservoir. The forming box interior is chosen and selected so as to provide the appropriate insulation taper from the pointed end of rod 29 as shown in FIG. 1.

The next step includes placing a square or rectangular plug 49a in the top of the fish feeder box to the right of divider 10 (FIG. 1). The feeder box is then turned upside down and all the working parts of the thermostatic mechanism including rod 34 and tube 33 are now assembled in their operative positions. While the fish feeder and thermostatic mechanism is upside down the second pour of liquid Styrofoam now fills the entire void in and around the thermostatic mechanism and is allowed to harden. The adhesion of the Styrofoam to the divider, insulation plug 49a, working elements of the thermostatic mechanism and the feeder box snugly locks the thermostatic mechanism in place. Once the second pour of Styrofoam has hardened, the feeder may be turned upright and the remaining assembly operation completed.

In operation, the thermostatic mechanism operates to control the position of bucket 17. For example, consider the situation where compartment 17d of bucket 17 is located directly below the hopper portion of the fish feeder and that the particulate fish feed has dumped its contents via chute 16 until the particulate fish feed rises in compartment 17d to a height equal to the lower end extremity of chute 16. At this particular height the flow of feed from the hopper to the bucket is cut off. Bucket 17 is maintained in this position by the presence of swivel pin 24 bearing against the lower surface 27f of tripping plate 27, as seen in FIG. 6.

As was noted above, in reference to the thermostatic mechanism, the heat reservoir 28 is generally constructed of a metal tube filled with concrete while tube 33 is aluminum. The heat reservoir or heat sink 28 will hold its acquired temperature for significantly longer periods and will not expand or contract at the same rate as aluminum tube 33.

Assume that compartment 17d of bucket 17 is filled with the particulate fish feed and that the late afternoon sun has set and the temperature has begun to decrease. Aluminum tube 33, as well as steel rod 34, will almost immediately recognize the ambient temperature change and begin to decrease in length or contract due to the decreasing ambient temperature. Heat reservoir 28 holds its temperature for a considerably longer period of time. In fact, tests have shown that due to the insulation design of the thermostatic mechanism, the temperature of heat reservoir 28 will either continue to rise or stay the same even after the ambient temperature starts its usual evening decrease. The relative change of lengths is felt in due course at the connecting pin 33b and horizontal channel 35. As aluminum tube 33 contracts, it pulls the right-hand end of channel member 35 (see FIG. 6) upwardly, causing this channel member to fulcrum about the point where rod 29 seats in bolt 36. This pulling up of the right-hand portion of channel 35 necessarily imparts a downward movement to the left-hand portion of same. Inherently, steel rod 34 will contract a slight amount with the decreasing temperature, the amount of contraction being less than the aluminum tube 33 but substantially more than heat reservoir 28, which, as mentioned above, may even be elongating. Channel member 35 and rod 34 thereby act on channel 37 via pin 39 to impart a clockwise turning moment to channel 37. It should be pointed out that in this condition, the transverse lugs 34b on rod 34 contact the underside of transverse plate 37c due both to the downward force on pin 39 by bracket 35 and to the slight contraction of rod 34. When the temperature has decreased to a predetermined point, determined by the expansion coefficient of the materials and the relative dimensions, the tension on spring 40 will be overcome by the above-mentioned turning or twisting moment being applied to channel 37. At this point, the left end portion of channel 37 will be moved upwardly while the right end portion of same is moved downwardly. As the left-hand portion of channel 37 moves upwardly, the upper end portion of arm 45 moves to the right (FIG. 6) due to the pressure exerted against friction plate 46 by spring 47. The movement of arm 45 to the right causes interconnected tripping plate 27 to follow until the end extremity of swivel pin 24 no longer is in contact with surface 27f and passes through aperture 27a in tripping plate 27. The resultant effect is to allow the weight of the particulate feed in compartment 17d to pivot bucket bucket 17 in a clockwise direction on rod 18 until the lower portion of the bucket contacts adjustable stop 22. In this position, the particulate fish feed is dumped from the bucket, and swivel pin 24 moves in an arc with rod 23 until its outer end extremity contacts the underside 27e of tripping plate 27. This contacting position holds the bucket in a stationary position as the particulate feed now fills the heretofore empty compartment 17e to a level determined once again by the orientation of the top of compartment 17e relative to chute 16.

Since there is always a possibility of extreme temperature changes, aperture 45a allows further movement of channel 37 without effecting damaging upper end movement of arm 45. Thus, when the tripping position has been reached and tripping plate 27 moves into contact with stop 26a, arm 45 will not exert additional force on the contacting elements because leg 44a is allowed to freely move within enlarged aperture 45a.

With compartment 17e of bucket 17 now filled with the particulate fish feed, this position will be maintained until a significant change in ambient temperature occurs. Due to the construction of the thermostatic mechanism, the heat reservoir 28 is able to retain an acquired incremental length position so that slight temperature changes will not result in the fish feed being dispensed. Additionally, the lost motion mechanism further requires substantial temperature change in order to initiate the lateral shifting of tripping plate 27.

Assume now that the morning sun has come out and the ambient temperature around the fish feeder has risen high enough to cause expansion or elongation of aluminum tube 33 relative to heat reservoir 28. As tube 33 elongates, a downward motion or force is applied to the right-hand end portion of channel 35 (FIG. 6). This downward movement tends to rotate channel 35 in a clockwise direction in such a manner that the left-hand end of channel 35 moves upwardly. This upward movement is imparted to channel 37 through pin 39 and results in an upward movement of same sufficiently to relieve the pressure contact between the transverse plate 37c and lugs 34b on the end portion of steel rod 34. Of course, rod 34 will have elongated slightly, thusly aiding in the elimination of the pressure contact between the above-mentioned elements.

With transverse plate 37 no longer in pressure contact with the end portion of rod 34, spring 40 will pull the right-hand end portion of channel 37 upwardly thusly pivoting the left-hand end portion downwardly about connecting pin 39. With channel 37 now simulating a counterclockwise rotation about pin 39, the lost motion mechanism will move to the left. As the temperature increases, arm 45 continues to move following the lost motion mechanism and eventually causing tripping plate 27 to move until apertures 27a and 25 are again aligned. The aligned apertures allow swivel pin 24 to protrude therethrough and the contents within compartment 17e to be dumped from the bucket 17 in a manner similar to that described above. Once bucket 17 has pivoted to the left in a contacting relationship with stop 22, swivel pin 24 will then again assume the position shown in FIG. 6 (contacting undersurface 27f of tripping plate 27) and compartment 17d will be once again filled with the particulate fish feed.

This process of dispensing the fish feed will then be repeated in a manner dictated by the ambient temperature change in and around the fish feeder that is associated with the sunrise and sunset. Accordingly, the above-mentioned device needs only to be refilled at regular intervals, depending on the size of the feed hopper, in order to insure reliable fish feeding at preselected time intervals.

From the foregoing, it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. An apparatus for automatically dispensing particulate material such as fish feed, said apparatus comprising;
   a hopper, said hopper having a discharge opening defined in the lower portion thereof,
   a reversing bucket, said bucket having two separated compartments and mounted for pivotal movement so that one of said compartments is in communicating relationship with said discharge opening while the other compartment is in a dispensing position, and
   means for thermally controlling the pivotal movement of said bucket said means having a lever bucket release associated therewith.

2. The invention as in claim 1 wherein said thermal means includes a heat reservoir having a preselected expansion coefficient and an associated metal structure having an expansion coefficient different from that of said heat reservoir, said metal structure and said heat reservoir cooperating during periods of a preselected ambient tempeatue change to povide a means to initiate the controlling of the pivotal movement of said bucket.

3. The invention as in claim 2 wherein said heat reservoir is surrounded by an insulating material, said insulating material cooperating with said construction of said heat reservoir to maintain optimum temperature control thereof during slight ambient temperature fluctuations.

4. The invention as in claim 2 wherein a motion translation linkage is operatively associated with said heat reservoir and said metal structure to sense the relative dimension changes due to temperature changes around said apparatus, said linkage including first and second interconnected pivotal members that move in opposite relative directions in accordance with said relative dimension changes of said reservoir and said metal structure.

5. The invention as in claim 4 wherein a lost motion mechanism connects said second pivotal member with a means for tripping said bucket to a feed dispensing position, said lost motion mechanism requiring a preselected amount of movement of said translating linkage before said tripping means is activated and operable to prevent extreme temperature changes from damaging said tripping means.

(References on following page)

References Cited

UNITED STATES PATENTS

| | | | |
|---|---|---|---|
| 1,029,623 | 6/1912 | Nieman | 119—51.5 |
| 1,067,763 | 7/1913 | Shelton | 119—38 |
| 1,219,114 | 3/1917 | Lappas | 119—51.5 |
| 1,274,166 | 7/1918 | Hume | 236—101 |
| 1,903,742 | 4/1933 | Bendel | 119—51.5 |
| 2,538,413 | 1/1951 | Chard | 222—70 |
| 2,700,489 | 1/1955 | Sheft | 222—170 |
| 3,050,029 | 8/1962 | Appleton | 119—51.13 |
| 3,276,630 | 10/1966 | Welch | 222—54 |

ALDRICH F. MEDBURY, *Primary Examiner.*

U.S. Cl. X.R.

119—51, 56; 222—54; 236—101; 185—33